J. J. SCHUBERT.
POTATO DIGGER.
APPLICATION FILED JUNE 5, 1911.

1,033,475.

Patented July 23, 1912.
3 SHEETS—SHEET 2.

WITNESSES
M. R. McInnis
Jo. E. Sorensen

INVENTOR
JULIUS J. SCHUBERT
BY
Paul & Paul
HIS ATTORNEYS

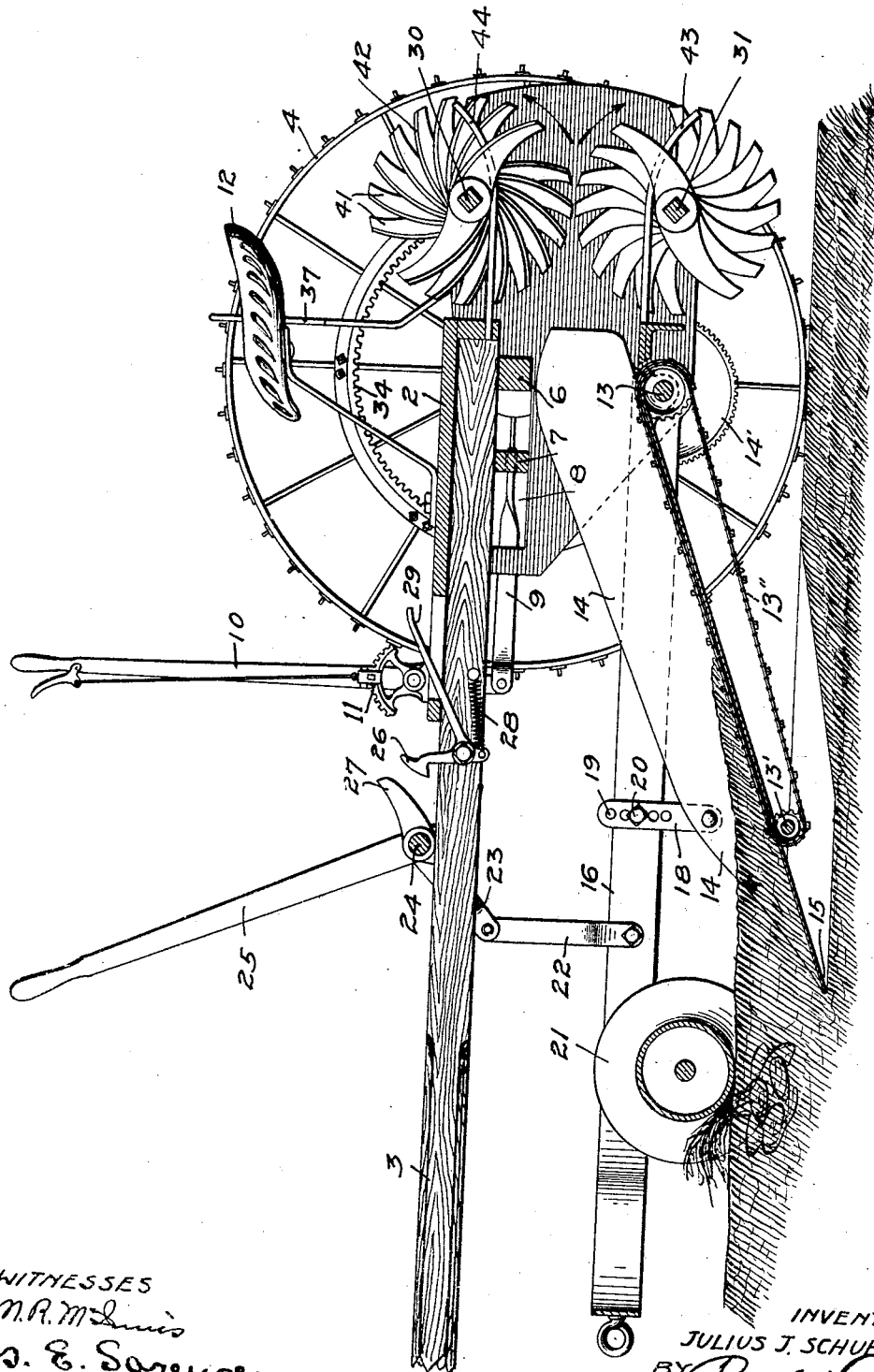

UNITED STATES PATENT OFFICE.

JULIUS J. SCHUBERT, OF OSSEO, MINNESOTA.

POTATO-DIGGER.

1,033,475.

Specification of Letters Patent. Patented July 23, 1912.

Application filed June 5, 1911. Serial No. 631,329.

*To all whom it may concern:*

Be it known that I, JULIUS J. SCHUBERT, of Osseo, Hennepin county, Minnesota, have invented certain new and useful Improvements in Potato-Diggers, of which the following is a specification.

The object of my invention is to provide a potato digging machine by means of which the potatoes may be dug out of the ground, the dirt shaken from them and the potatoes delivered in a windrow in the rear and at one side of the machine where they can be conveniently picked up.

A further object is to provide a machine which can be conveniently used on a side hill without interfering in any way with its successful operation.

Other objects of the invention will appear from the following detailed description.

The invention consists generally in various constructions and combinations, all as hereinafter described and particularly pointed out in the claims.

Figure 1:
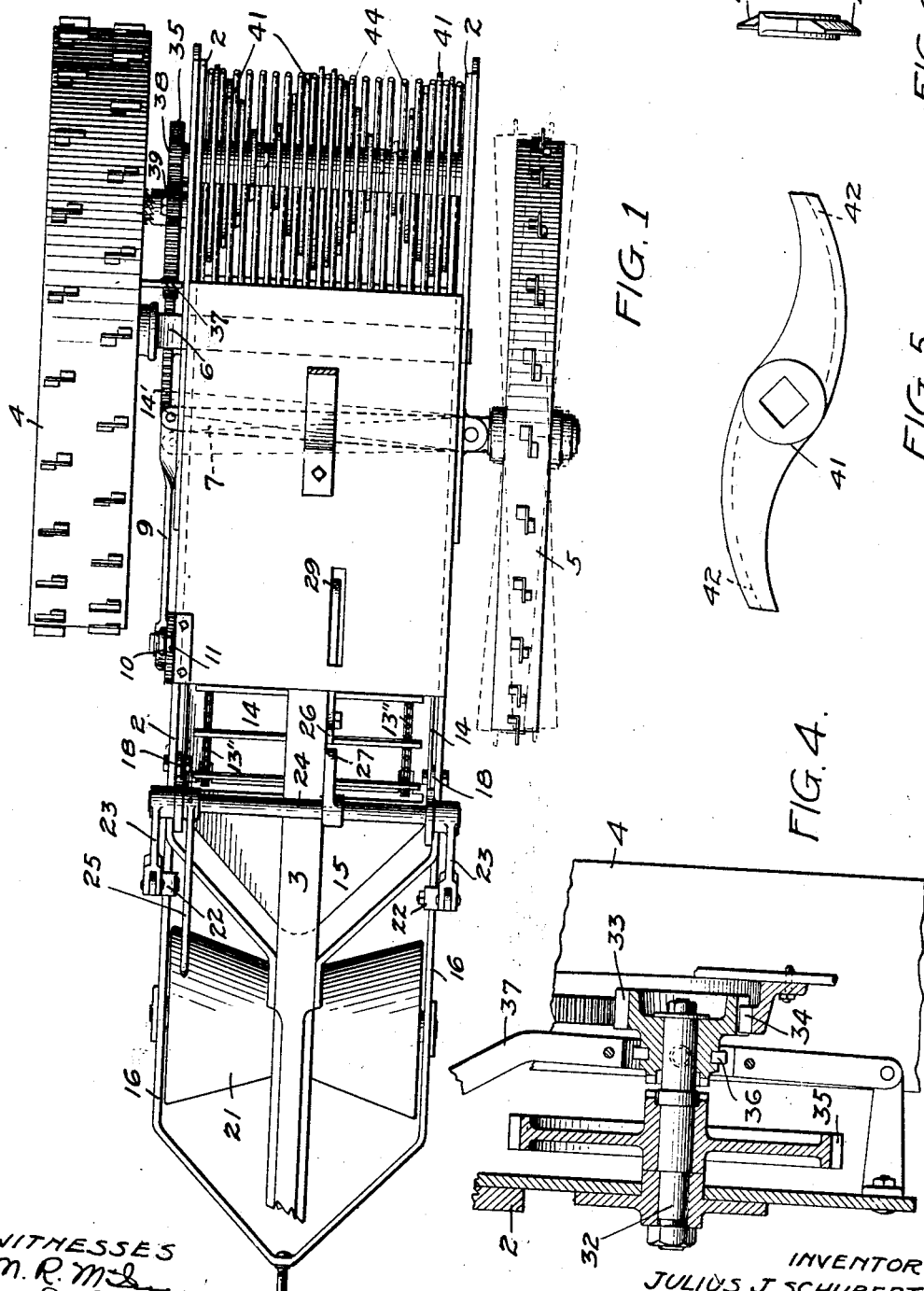
Figure 2:
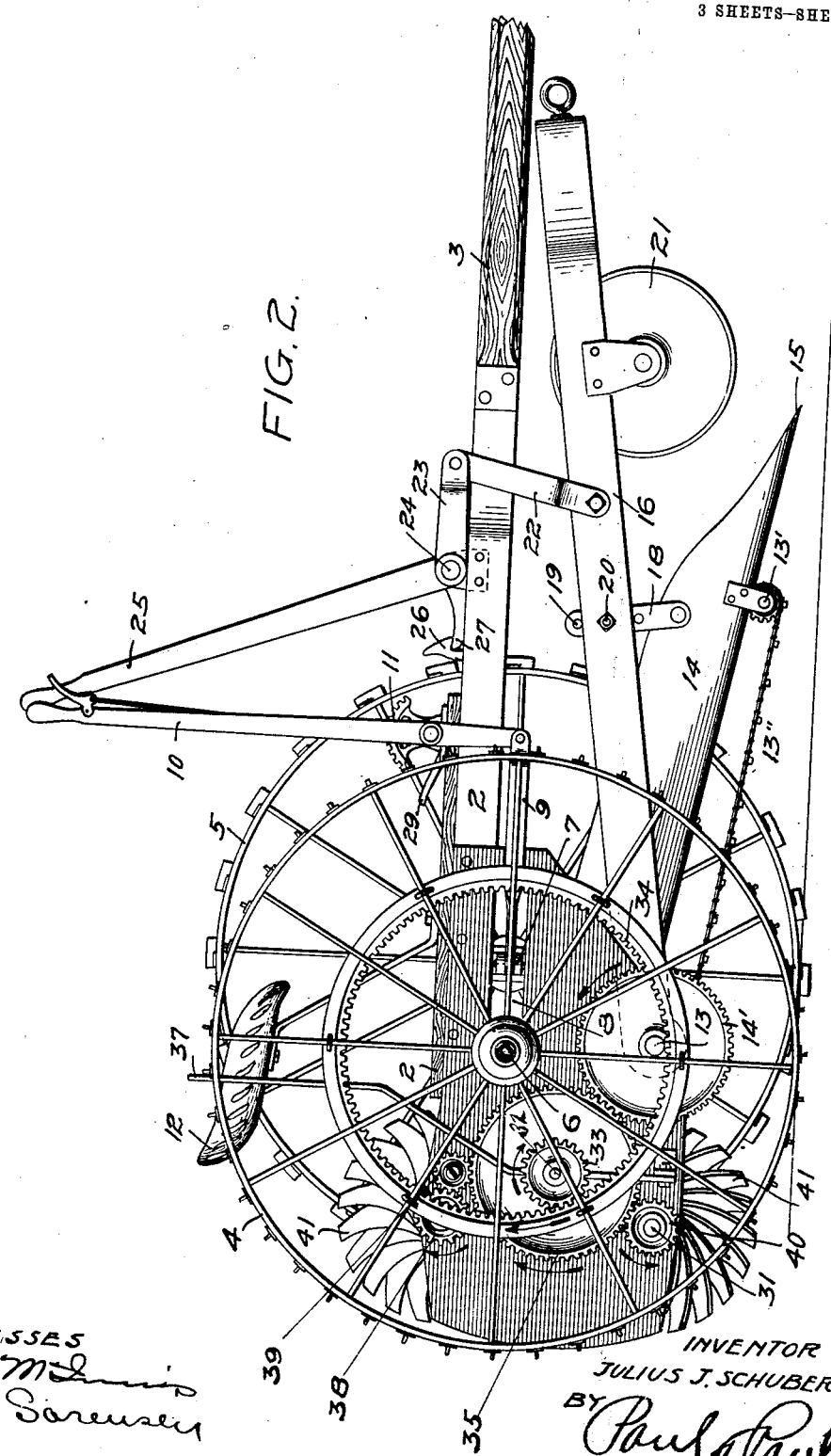

In the accompanying drawings forming part of this specification, Figure 1 is a plan view of a potato digging machine embodying my invention, Fig. 2 is a side elevation of the same, Fig. 3 is a longitudinal, vertical section of the machine, Fig. 4 is a detail view of the clutch mechanism for rendering the spirally arranged arms operative or inoperative. Figs. 5 and 6 are detail views of the arms by means of which the potatoes are delivered on the side of the machine.

In the drawing, 2 represents the frame of the machine, having a draft pole 3 and carrying wheels 4 and 5. The wheel 4 is mounted on an axle 6 which has bearings in the machine frame and the wheel 5 is mounted on an axle 7 which also has bearings in the frame of the machine and is capable of oscillation horizontally in a guide 8 for the purpose of swinging the wheel 5 in a horizontal plane to adapt the machine for use on a side hill. This oscillation of the shaft or axle 7 is effected by means of a link 9 and a lever 10 having the usual latch and quadrant 11 and disposed near the driver's seat 12.

A shaft 13 is mounted in the rear portion of the machine and a potato digging device 14 is pivoted thereon and has a point 15 adapted to enter the ground and is vertically adjustable on a frame 16 by means of links 18 having holes 19 therein and bolts 20 by means of which the desired pitch or inclination of the digger can be obtained. The frame 16 carries a roll 21 in advance of the digger, having a concave face that is adapted to contact with the vines and direct them toward the middle portion of the roll so that they will not catch on the side walls of the digger. The frame 16 is pivoted on the shaft 13 and is vertically adjustable by means of links 22 which connect said frame with arms 23 secured on a rock shaft 24 that is operated by means of a lever 25. The frame 16 is locked in its raised position by means of a dog 26 held in the path of an arm 27 on the shaft 24 by means of a spring 28. A foot operated lever 29 is connected with the dog 26 within convenient reach of the driver so that the dog may be tripped and the frame 16 released to drop the roll and the forward end of the digger to their working position.

In the rear of the driver's seat I provide shafts 30 and 31 driven from the wheel 4, preferably in the following manner: 32 is a shaft provided at its outer end with a pinion 33 meshing with a gear 34 on the wheel 4. A gear 35 is loosely mounted on the shaft 32 and is adapted to be locked thereon by means of a clutch 36 controlled by a lever 37 arranged near the driver's seat. The shaft 30 is driven from the gear 35 through a pinion 38 fastened on said shaft and an idle pinion 39 and the pinion 40 mounted on the shaft 31 meshes directly with the gear 35. The shafts 30 and 31 will be driven, therefore, positively and in opposite directions, as indicated by the arrows in Fig. 2. These shafts may be rendered operative or inoperative at any time by means of the lever 37. Upon these shafts, which are preferably square in cross section, as indicated in Fig. 3, I provide a series of feeding blades or arms 41 having beveled faces 42 and spirally disposed upon the shafts so that as the potatoes are delivered to them from the rear end of the digger the tendency will be to work the potatoes laterally or lengthwise of the shafts 30 and 31 until they pass out of the machine. The spiral arrangement of the blades on the lower shaft is opposite to that of the blades on the upper shaft and the beveled faces are also oppositely arranged so that the potatoes will feed laterally in one direction and the vines and other refuse material gathered up by the digger will move in the other direction, the potatoes falling in a row at one side of the machine and the vines being discharged at the other side. I prefer also to provide tines or fingers 43 and 44 projecting between the upper and lower spirals to prevent the vines and refuse material from wrapping around the shafts.

I may prefer to provide in connection with the potato digging device 14 a carrier belt 13″ having its lower portion supported by a shaft 13′ and driven through the shaft 13 and gear 14′.

I claim as my invention:—

1. A potato digger comprising a frame having carrying wheels, a digger mounted therein, shafts arranged one above another in the rear of said digger, feeding blades spirally arranged on said shafts and operating to feed the potatoes transversely of the machine, and means for revolving said shafts and blades in opposite directions.

2. A potato digger comprising a frame having carrying wheels, a digger mounted in said frame, a revolving shaft in the rear of said digger, feeder blades mounted on said shaft and having beveled feeding faces, said blades being spirally arranged and operating to feed the potatoes laterally or to one side of the machine.

3. A potato digger comprising a frame having carrying wheels, a digger mounted in said frame, upper and lower feeder blades arranged in the rear of said digger, said lower blades operating to feed the potatoes to one side of the machine and said upper blades operating to feed the vines and refuse material toward the other side of the machine.

4. A potato digger comprising a frame having carrying wheels, a digger mounted in said frame, upper and lower feeder blades spirally arranged, the upper blades being oppositely arranged from the lower blades and both sets of blades having driving connections with one of said wheels and revolving in opposite directions, one of said sets of blades feeding the potatoes toward one side of the machine and the other set of blades feeding the vines and refuse material toward the other side of the machine.

5. A potato digger comprising a frame having carrying wheels, a digger mounted in said frame, upper and lower shafts in the rear of said digger, blades centrally mounted on said shafts and having beveled ends, means for revolving said shafts and blades in opposite directions, the blades of one of said shafts operating to feed the potatoes to one side of the machine and the blades on the other shaft operating to feed the vines and refuse material toward the opposite side of the machine.

6. The combination, with an upper group of feeder blades, operating to feed the vines and refuse material toward the side of the machine, of a lower group of feeder blades operating to feed the potatoes toward the opposite side of the machine, and means for driving said groups of feeder blades.

7. In a machine of the class described, a revolving shaft, feeder blades mounted on said shaft and having beveled feeding faces, said blades being spirally arranged and operating to feed the potatoes laterally or to one side of the machine.

In witness whereof, I have hereunto set my hand this 23d day of May 1911.

JULIUS J. SCHUBERT.

Witnesses:
GENEVIEVE E. SORENSEN,
EDWARD A. PAUL.

Copies of this patent may be obtained for five cents each, by addressing the "Commissioner of Patents. Washington, D. C."